Figure 4:
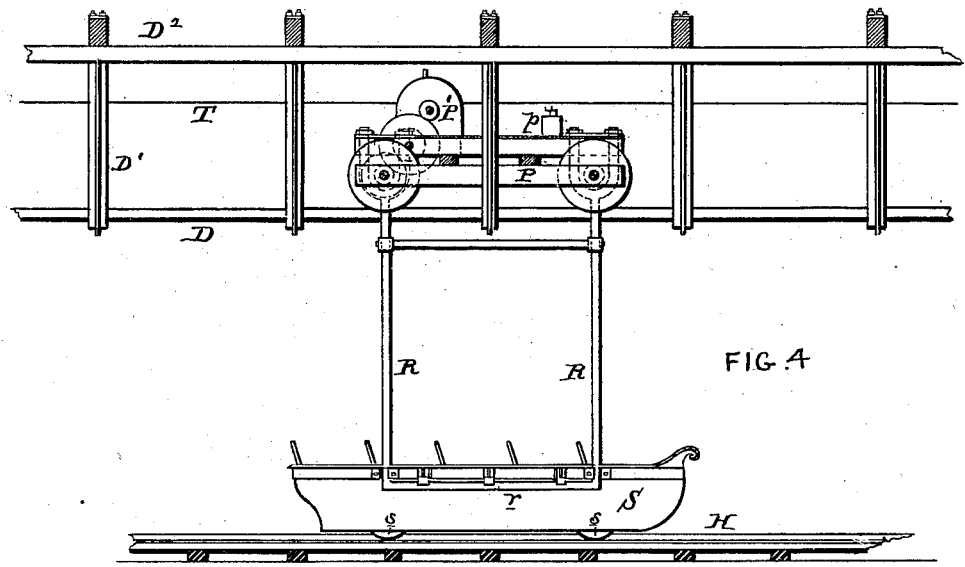

No. 687,370. Patented Nov. 26, 1901.
J. R. DOUGLASS.
SCENIC RAILWAY.
(Application filed Aug. 28, 1901.)
(No Model.) 3 Sheets—Sheet 1.
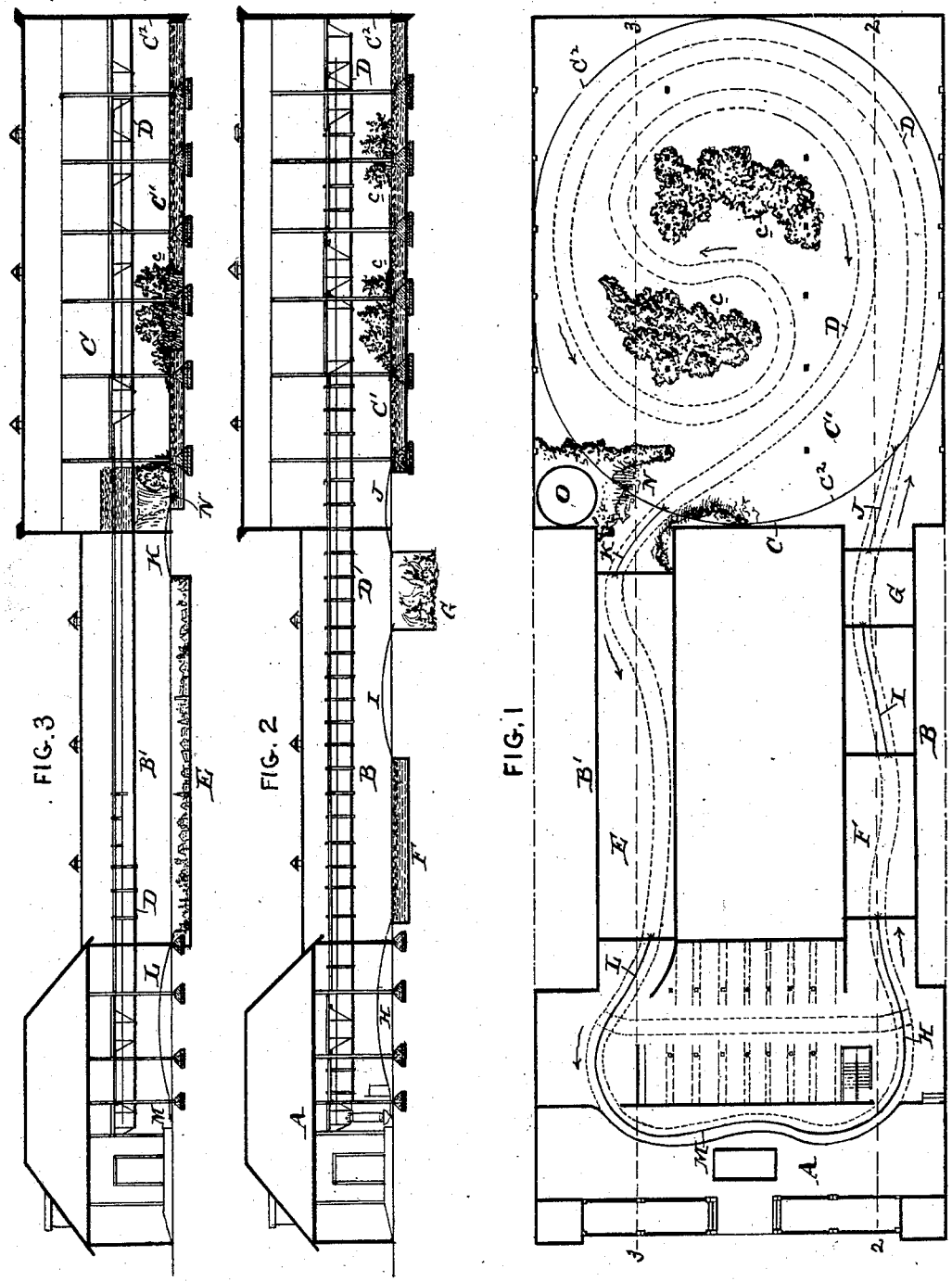
WITNESSES
INVENTOR
Johnson R. Douglass
BY
ATTORNEY No. 687,370. Patented Nov. 26, 1901.
J. R. DOUGLASS.
SCENIC RAILWAY.
(Application filed Aug. 28, 1901.)

(No Model.) 3 Sheets—Sheet 3.

WITNESSES:
William A. Lehman.
Thomas P. Dyer

INVENTOR
Johnson R. Douglass
BY
ATTORNEY

THE NORRIS PETERS CO., PHOTO-LITHO., WASHINGTON, D. C.

UNITED STATES PATENT OFFICE.

JOHNSON R. DOUGLASS, OF PHILADELPHIA, PENNSYLVANIA.

SCENIC RAILWAY.

SPECIFICATION forming part of Letters Patent No. 687,370, dated November 26, 1901.

Application filed August 28, 1901. Serial No. 73,589. (No model.)

*To all whom it may concern:*

Be it known that I, JOHNSON R. DOUGLASS, of the city and county of Philadelphia, State of Pennsylvania, have invented an Improvement in Scenic Railways, of which the following is a specification.

My invention has reference to scenic railways; and it consists of certain improvements, all of which are fully set forth in the following specification and shown in the accompanying drawings, which form a part thereof.

The object of my invention is to produce a scenic railway which shall also include aquatic or aerial features, or both, and in my preferred form of apparatus the conveyance is mechanically propelled and adapted in its travel to run upon a track of varying elevations, to travel suspended in the air over scenic effects, and to float upon one or more bodies of water, thereby combining the effects of a railway, a balloon, and a boat, the transformation from one to the other taking place in predetermined order and so as to give to the passenger a succession of surprises under varying conditions.

In carrying out my invention I provide a suitable building or structure with a continuous railway-track, preferably overhead, and below which are arranged at intervals along its length surface tracks of varying elevation, recessed or valley portions, and tank or lake portions containing water. With such structure I combine a mechanically-propelled carriage or truck adapted to the railway and having downwardly-extending hangers or suspension-rods, upon the lower ends of which are suspended boats having seats for the passengers. The said boats are so supported by said suspension-rods that they are free to rise and fall upon said rods under the action of the surface track and when floating upon the water, but are held against excessive downward movement when passing over the recessed or valley portions, whereby they are held suspended by the said rods and made to float, as it were, through the air. The under portions of the boats are provided with guide-wheels adapted to the surface tracks and cause the boat or vehicle to rise and fall to conform to the grade of said tracks while being propelled forward.

My improvements also embody many details of construction, and these, together with the more generic features of my invention, will be better understood by reference to the drawings, in which—

Figure 5:
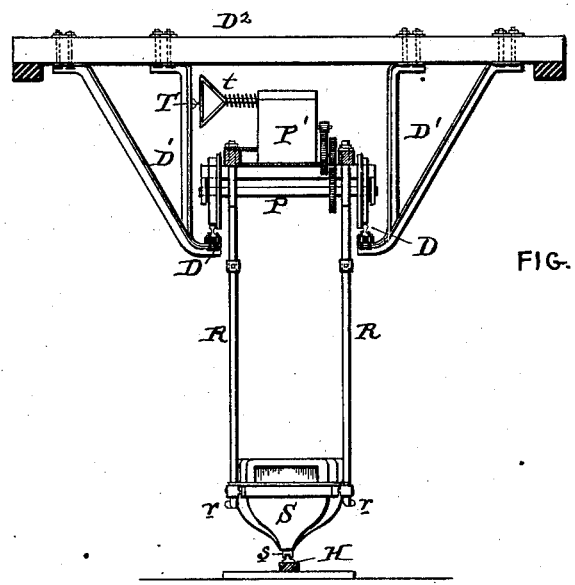
Figure 10:
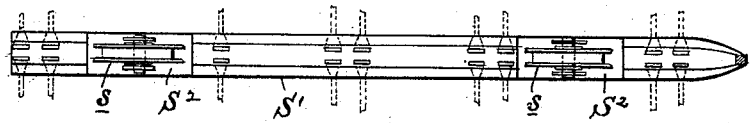
Figure 7:
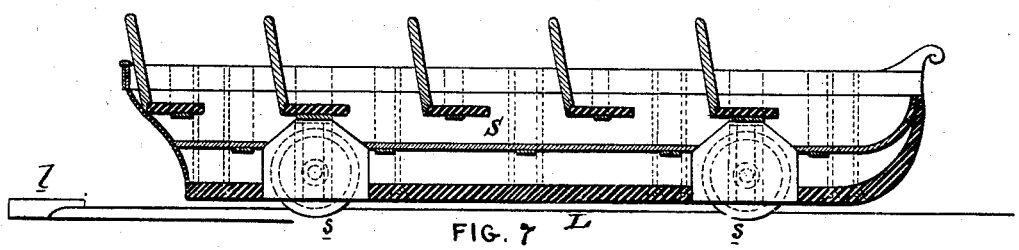
Figure 6:
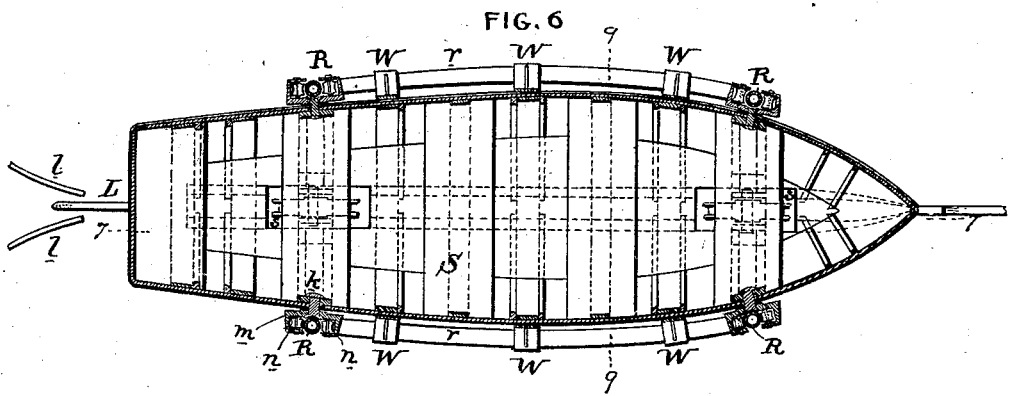
Figure 8:
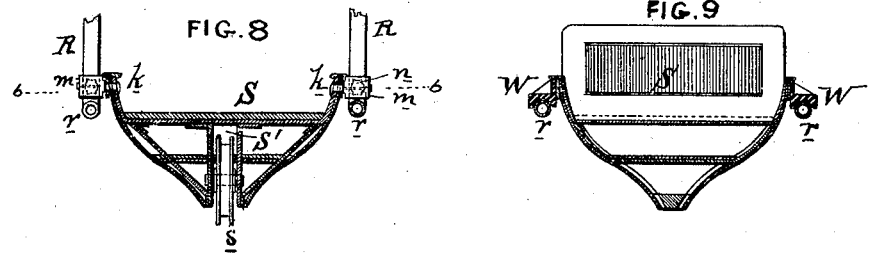
Figure 9:
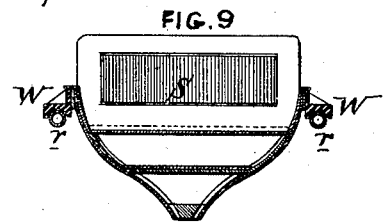

Figure 1 is a plan view of a scenic or pleasure railway with the roof of the building removed and embodying my improvements. Fig. 2 is a longitudinal sectional elevation of same on line 2 2 of Fig. 1. Fig. 3 is a similar longitudinal section on line 3 3 of Fig. 1. Fig. 4 is a side elevation of one of the boats, the propelling-truck, and railway structures. Fig. 5 is a cross-section of the track and an elevation of the truck and boat. Fig. 6 is a sectional plan view of the boat on line 6 6 of Fig. 8. Fig. 7 is a longitudinal sectional elevation of same on line 7 7 of Fig. 6. Fig. 8 is a cross-section of same on line 8 8 of Fig. 6. Fig. 9 is a cross-section of same on line 9 9 of Fig. 6, and Fig. 10 is a plan view of the metal keel and supporting-wheels.

The building may be divided as follows: The portion where the passengers get on and off the railway is at A, and this connects with the rear or large lake-house C by two side wings B B', one for the outward-bound boats and the other for the inward-bound boats. Of course it is evident that the superstructure of such buildings may be omitted, if so desired.

D is an overhead railway-track having a suitable circuitous route, as indicated in dotted lines in Fig. 1. This track may consist of the rails D, carried by downwardly-extending brackets or hangers D', secured at the top to the cross-framing $D^2$ of the superstructure or building. As shown this railway D is level; but it is evident that it need not be so made, as suitable grades may be introduced, if so desired, as will be readily understood by those familiar with the building and operation of pleasure-railways.

P is a car or truck adapted to be propelled over the railway D by suitable power in any well-known manner. As shown it is propelled by an electric motor P', which receives current by a trolley $t$ from a suspended trolley-wire T. The speed and operation of the motor may be controlled by a controller-switch $p$ in the well-known manner heretofore in use on electric railways. The trolley-wire acts as the outgoing or supply conductor and the rails as the return, and these conductors receive current from any suitable source of electric energy, such as a dynamo. (Not shown.) It is evident that steam, compressed air, gas, gasolene, or cable may be adopted as the means of propelling the truck, as may be found most expedient and economical.

From the truck P are downwardly-extending suspension-rods R, connected in pairs by longitudinal bars r at the bottom. These suspension-rods are received in suitable guides m upon opposite sides of the boats S, which carry the passengers. Preferably these guides m are pivoted to the boat, near the gunwale, on transverse pivots k and are provided with guide-rollers n n to reduce the friction. In this manner the boat is free to rise and fall upon the suspension-rods and is at the same time propelled forward thereby to follow the moving truck overhead. The boat is limited in its downward movement by stops or brackets W, secured to the side of the boat and adapted to rest upon the longitudinal bars r of the suspension-rods. This function of the brackets W comes into play when the boat is being carried through space and unsupported by the surface track or water, as will be more fully set out later on.

The boat S may be made in any suitable manner and, as shown, is provided with a keel-frame S', having boxes S² near its ends, in which the grooved guide-wheels s are journaled, these wheels projecting below the bottom of the boat and adapted to run upon rails H I J K L M, arranged upon the surface, and thus steady the boat against lateral movement relatively to the truck and also to raise and lower the boat in its forward travel to impart more or less of the "toboggan" effect to the trip.

The track M is horizontal, as at this place in the building A the passengers enter and leave the boats. At H this track rises and falls, as shown in Fig. 2, so that the boat first travels up an incline and then down one, and the latter may be more steep than the ascent, if so desired. The boat in descending the incline rushes into the lake F and is then floating. It is conveyed through this lake and then once more made to ascend and descend a track, as at I. Upon its descent this time it runs into space formed by a pit or depression G, which may be filled with a scenic effect—such, for example, as the "Inferno." While traveling over this pit G the brackets W of the boat rest upon the longitudinal rails r and hold the boat suspended in mid-air. In further travel the boat is once more caused to rise and then descend by track J and in descending runs into the large lake C' in the rear building C. This lake may be provided with islands c for effectiveness and the boat caused to make a very circuitous route through the lake and around the islands, as indicated in dotted lines. In this manner the several boats following in succession will be passing each other in opposite directions and impart a realistic effect. The side walls C² of this lake would be painted to represent distant scenery to heighten the illusion. As the boat is moved to leave the lake C it approaches the falls N, which are formed by water flowing over a rocky scene, between which is a passage-way for the boat.

O is a tank for supplying water for the waterfall effect.

The two sides of the waterfall-scene so shield the passage-way to the approaching boat that the effect is as if the boat were going to run into the waterfall and wet the occupants. The boat upon entering between the two parts of the waterfall-scene once more runs upon a railway-track, as at K, and then down again, and the boat is again suspended upon the suspension-rods and floats over the depression or valley E, which may contain a scenic effect of a village in the distance to give the impression of traveling through the air suspended as in a balloon. After passing over this valley E the boat is once more elevated by a track-rail L and guided in a gentle descent to the horizontal rail M or place of beginning.

The track-rails I, J, K, and L at their entrance end are tapered to receive the wheels s of the boat and are furnished with guide-irons l l to guide the wheels properly upon the rail. This is shown in Figs. 6 and 7.

It is evident that the boat in passing from the water to the land or through space is required to be raised or first raised and then lowered, so as to be lifted out of the water to continue its travel while retaining the water within its boundary. In this manner we have considerable irregularity to the level of the boat, and this in practice is increased to improve the traveling impressions.

I have described my invention with regard to details which I prefer to use; but it is manifest that many of these may be greatly modified without departing from the spirit of the invention. I would also point out that while I have shown a succession of parts constituting land, air, and water routes I do not confine myself to this arrangement, as any two or more of these may be employed and the order of their arrangement may be varied to suit the ideas of the designer. It is also evident that while I prefer to employ a central surface rail the track for elevating the boat may be made without rails, allowing the wheels to run upon the inclined track or roadway, and while I have described the vessel as a boat it may be made of any other shapes, if so desired.

Having now described my invention, what I claim as new, and desire to secure by Letters Patent, is—

1. In a scenic railway, the combination of a lake, a surface trackway leading out of the lake and back into it, an elevated railway arranged over the surface track and lake, a motor truck or car traveling upon said railway, a boat adapted to float upon the lake and having wheels to run upon the surface trackway, and means extending from the motor-truck to the boat to propel it over the trackway and through the lake.

2. In a scenic railway, the combination of a lake, a surface trackway leading out of the lake and back into it, an elevated railway arranged over the surface track and lake, a motor truck or car traveling upon said railway, a boat adapted to float upon the lake and having wheels to run upon the surface trackway, and means extending from the motor-truck to the boat consisting of suspension-rods depending from the truck and guides on the boat guided upon said suspension-rods to propel it over the trackway and through the lake.

3. In a scenic railway, the combination of two surface track-sections having inclined portions, a depression or valley between said track-sections and containing a scenic structure, an elevated railway arranged above the track-sections and valley, a motor-truck traveling upon the elevated railway, suspension devices from the motor-truck, and a passenger-carrying vessel carried by the suspension devices and adjustable vertically upon the suspension devices and also having means for running upon the track-sections.

4. In a scenic railway, a large lake having islands, combined with inclined entering surface track, an inclined leaving surface track, a boat having guide-wheels for the surface tracks, an elevated railway over the lake and having a circuitous route to follow the surface tracks and extend about and between the islands in the lake, a motor-truck to travel upon the elevated railway, and connecting means between the boat and track whereby the former is propelled.

5. In a scenic railway, the combination of a lake, an inclined surface track leading down into the lake, a horizontal elevated track, a motor-truck traveling upon the elevated track, a boat having wheels adapted to the inclined track, and adjustable connecting means between the truck and boat whereby the boat is moved by the truck down the surface track and through the lake.

6. In a scenic railway, the combination of a lake, an inclined surface track leading down into the lake, a horizontal elevated track, a motor-truck traveling upon the elevated track, a boat having wheels adapted to the inclined track, and adjustable connecting means between the truck and boat consisting of downwardly-extending rods from the truck and guides for said rods secured to the boat, whereby the boat is moved by the truck down the surface track and through the lake.

7. In a scenic railway, the combination of a lake, an inclined surface track leading down into the lake, an inclined surface track leading out of the lake having inclined guide-irons $l, l$, at its forward end, a horizontal elevated track, a motor-truck traveling upon the elevated track, a boat having grooved wheels adapted to the inclined tracks, and adjustable connecting means between the truck and boat whereby the boat is moved by the truck down the surface track and through the lake and then out of the lake up the other inclined track.

8. In a scenic railway, the combination of a depression or valley, a surface track inclined downward into the valley, a second surface track from the valley and inclined upward, and having lateral guide-irons at its point to guide the wheels upon the rail, a horizontal elevated railway above the surface tracks and valley, a passenger vessel having guide-wheels adapted to the surface railways, a motor-truck running upon the elevated railway, downwardly-extending suspension-rods from the truck, guides on the vessel for receiving the rods and imparting their forward motion to the vessel, and means to limit the movement of the passenger vessel from the motor-truck.

9. In a scenic railway, the combination of a depression or valley, a surface track inclined downward into the valley, a second surface track from the valley and inclined upward, a horizontal elevated railway above the surface tracks and valley, a passenger vessel having guide-wheels adapted to the surface railways, a motor-truck running upon the elevated railway, downwardly-extending suspension-rods from the truck connected in pairs by longitudinal guides on the vessel for receiving the rods and imparting their forward motion to the vessel, and brackets W to limit the movement of the passenger vessel from the motor-truck.

10. In a scenic railway, the combination of a series of tanks or portions depressed below the normal surface one or more of which contains water, sections of surface tracks curving upward and downward for connecting the said depressed portions, and a horizontal elevated railway above said depressed portions and the surface tracks.

11. In a scenic railway, the combination of a series of tanks or portions depressed below the normal surface one or more of which contains water, sections of surface tracks curving upward and downward for connecting the said depressed portions, a horizontal elevated railway above said depressed portions and the surface tracks, and a boat having guide-wheels adapted to the surface tracks, a motor-truck traveling upon the elevated railway, and connecting devices between the motor-truck and boat.

12. In a scenic railway, a surface rail, an elevated railway above the surface rail, a motor-truck for the elevated railway, a passenger-vehicle for the surface rail guided upon it, and connecting devices between the motor-truck and passenger-vehicle.

13. In a scenic railway, a surface rail, an elevated railway above the surface rail, a motor-truck for the elevated railway, a passenger-vehicle for the surface rail guided upon it, and connecting devices between the motor-truck and passenger-vehicle consisting of downwardly-extending rods from the truck and guides for the rods on the vehicle whereby it is moved forward with the motor-truck and also free to adjust itself to the alinement of the surface rail.

14. In a scenic railway, a surface rail, an elevated railway above the surface rail, a motor-truck for the elevated railway, a passenger-vehicle for the surface rail guided upon it, and connecting devices between the motor-truck and passenger-vehicle consisting of vertically-adjustable power-transmitting connections whereby the vehicle moves forward with the motor-truck but has independent freedom of vertical motion to compensate for irregularities in alinement of the elevated and surface tracks.

In testimony of which invention I have hereunto set my hand.

JOHNSON R. DOUGLASS.

Witnesses:
WILLIAM A. LEHMAN,
THOMAS P. DYER.